(12) United States Patent
Park et al.

(10) Patent No.: US 11,379,116 B2
(45) Date of Patent: Jul. 5, 2022

(54) ELECTRONIC APPARATUS AND METHOD FOR EXECUTING APPLICATION THEREOF

(71) Applicant: Samsung Electronics Co., Ltd., Suwon-si (KR)

(72) Inventors: SeHwan Park, Hwaseong-si (KR); Sungwook Park, Goyang-si (KR); Jaeyong Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/022,708

(22) Filed: Sep. 16, 2020

(65) Prior Publication Data

US 2021/0004156 A1 Jan. 7, 2021

Related U.S. Application Data

(63) Continuation of application No. 15/032,522, filed as application No. PCT/KR2014/010480 on Nov. 4, 2014, now abandoned.

(30) Foreign Application Priority Data

Nov. 4, 2013 (KR) .......... 10-2013-0132807

(51) Int. Cl.
 *G06F 3/048* (2013.01)
 *G06F 3/04886* (2022.01)
 (Continued)

(52) U.S. Cl.
 CPC ........ *G06F 3/04886* (2013.01); *G06F 3/0412* (2013.01); *G06F 3/0482* (2013.01); *G06F 3/0486* (2013.01); *H04M 1/72469* (2021.01)

(58) Field of Classification Search
 CPC .. G06F 3/04886; G06F 3/0482; G06F 3/0486; G06F 3/0412; H04M 1/72583
 (Continued)

(56) References Cited

U.S. PATENT DOCUMENTS

| | | |
|---|---|---|
| 8,775,407 B1 | 7/2014 | Huang |
| 2006/0015819 A1 | 1/2006 | Hawkins et al. |

(Continued)

FOREIGN PATENT DOCUMENTS

| | | |
|---|---|---|
| CN | 101237646 A | 8/2008 |
| CN | 102006563 A | 4/2011 |

(Continued)

OTHER PUBLICATIONS

Chinese Office Action dated Sep. 26, 2018, issued in Chinese Application No. 201480060294.5.

(Continued)

*Primary Examiner* — Aleksey Olshannikov
(74) *Attorney, Agent, or Firm* — Jefferson IP Law, LLP

(57) ABSTRACT

The disclosure relates to a method for executing an electronic apparatus application including the steps of generating on a screen a keyboard interface including a virtual input keypad and an output region in response to a first user input, receiving a second user input using the virtual input keypad of the keyboard interface and displaying the same on the output region; determining a data attribute of the second user input, displaying a menu including one or more applications corresponding to the data attribute, and receiving a third user input selecting one of the one or more applications included in the menu and executing the selected application. In addition, various different embodiments are possible.

6 Claims, 7 Drawing Sheets

(51) Int. Cl.
*H04M 1/72469* (2021.01)
*G06F 3/041* (2006.01)
*G06F 3/0482* (2013.01)
*G06F 3/0486* (2013.01)

(58) Field of Classification Search
USPC .......................................................... 715/773
See application file for complete search history.

(56) References Cited

U.S. PATENT DOCUMENTS

| | | | |
|---|---|---|---|
| 2006/0114239 A1* | 6/2006 | Nakajima | G06F 3/04883 345/173 |
| 2007/0156747 A1 | 7/2007 | Samuelson et al. | |
| 2008/0186283 A1 | 8/2008 | Kim et al. | |
| 2010/0008490 A1 | 1/2010 | Gharachrloo et al. | |
| 2010/0306698 A1 | 12/2010 | Sellers et al. | |
| 2010/0318696 A1* | 12/2010 | Ruotslainen | H04M 1/2745 710/67 |
| 2011/0125733 A1 | 5/2011 | Fish et al. | |
| 2011/0320307 A1 | 12/2011 | Mehta et al. | |
| 2012/0075231 A1 | 3/2012 | Kwahk et al. | |
| 2013/0063357 A1 | 3/2013 | Lee et al. | |
| 2013/0174195 A1* | 7/2013 | Witenstein-Weaver | H04N 21/4722 725/32 |
| 2013/0285926 A1* | 10/2013 | Griffin | G06F 3/04886 345/173 |
| 2013/0294002 A1 | 11/2013 | Thompson et al. | |
| 2014/0068497 A1 | 3/2014 | Park et al. | |
| 2014/0096053 A1* | 4/2014 | Lee | G06F 3/0488 715/769 |
| 2014/0123018 A1* | 5/2014 | Park | G06F 3/0484 715/738 |
| 2014/0351762 A1 | 11/2014 | Park et al. | |
| 2015/0077358 A1 | 3/2015 | Wang | |

FOREIGN PATENT DOCUMENTS

| | | |
|---|---|---|
| CN | 103218146 A | 7/2013 |
| CN | 104461338 A | 3/2015 |
| EP | 1 954 015 A2 | 8/2008 |
| EP | 2 717 148 A2 | 4/2014 |
| JP | 2004-295805 A | 10/2004 |
| KR | 10-2006-0119392 A | 11/2006 |
| KR | 10-2010-0132293 A | 12/2010 |
| KR | 10-2011-0098557 A | 9/2011 |
| KR | 10-2014-0028972 A | 3/2014 |
| KR | 10-2014-0136857 A | 12/2014 |
| WO | 2013-141464 A1 | 9/2013 |

OTHER PUBLICATIONS

Examination Report dated Jun. 9, 2020 issued in United Kingdom Office Action Application No. GB1607775.2.
United Kingdom Search Report dated Mar. 9, 2021, issued in United Kingdom Patent Application No. GB1607775.2.

* cited by examiner

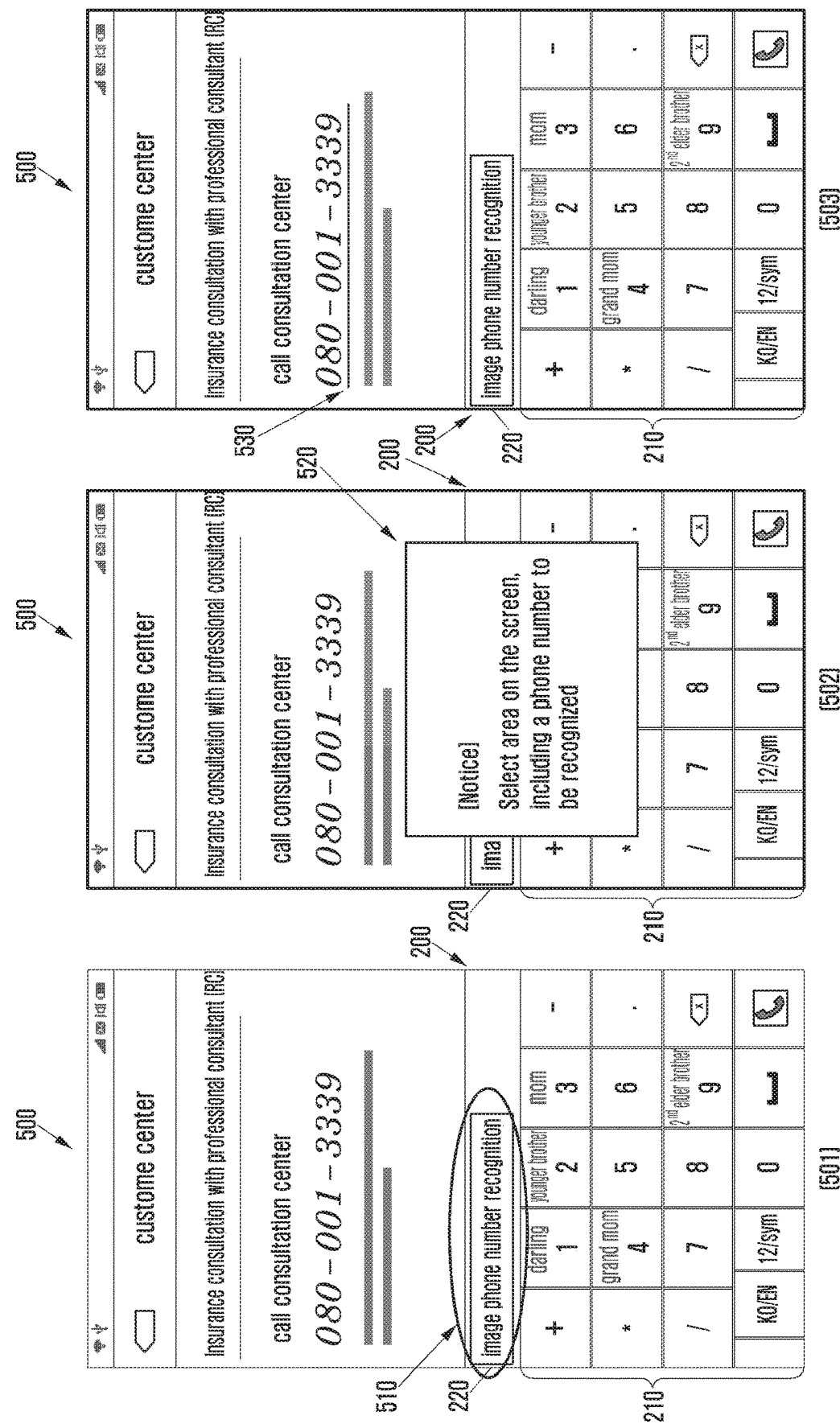

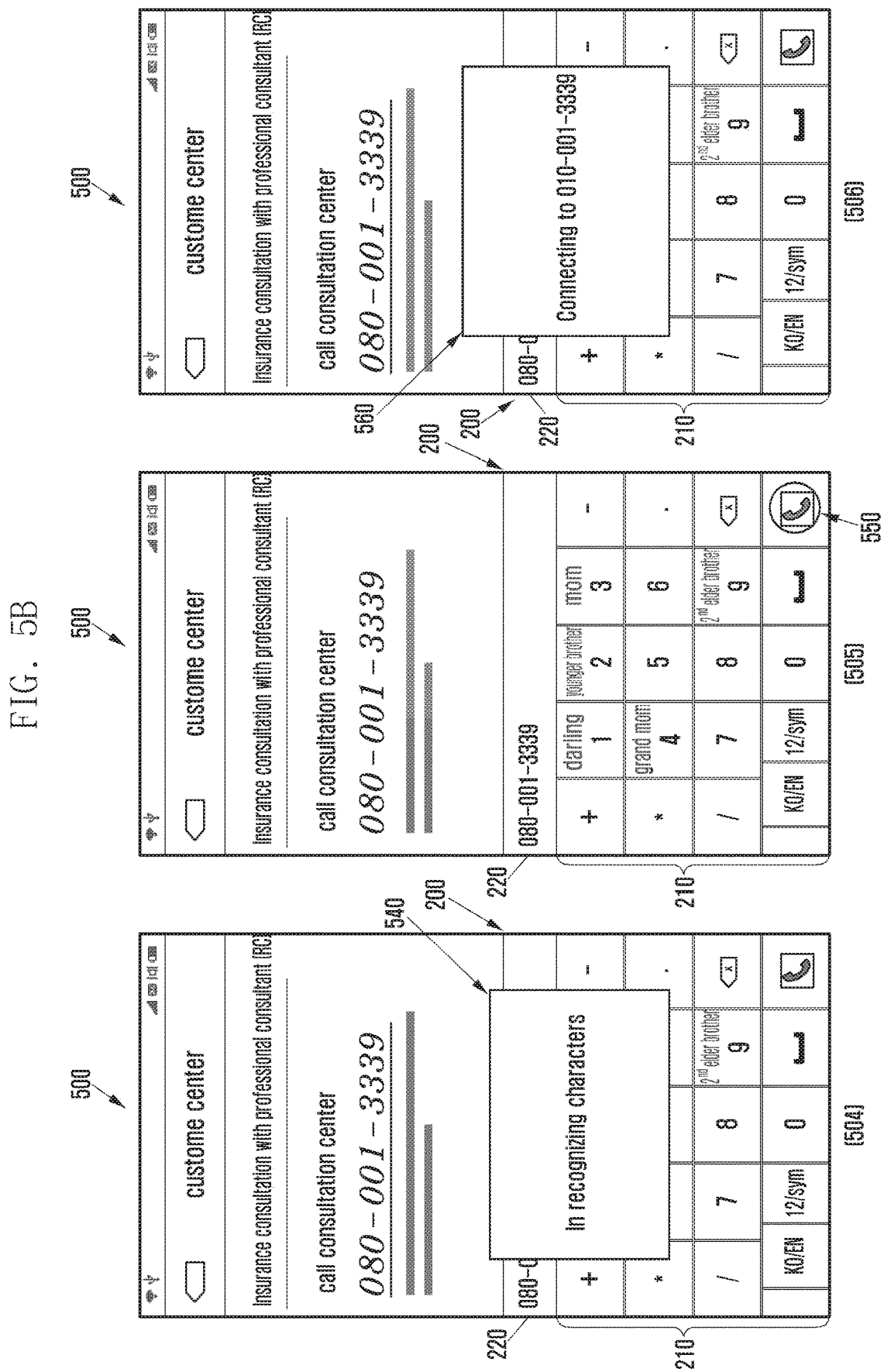

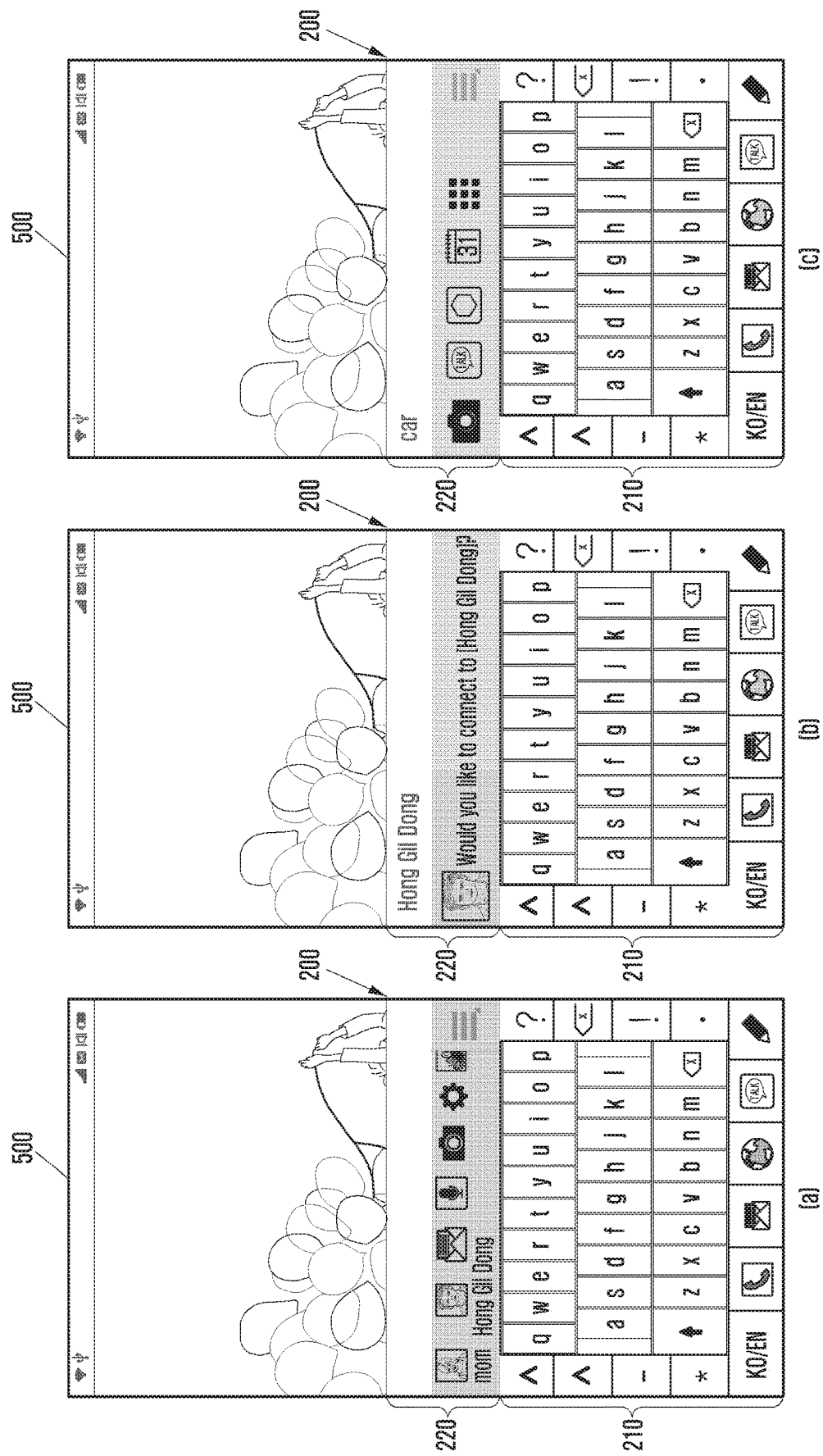

ELECTRONIC APPARATUS AND METHOD FOR EXECUTING APPLICATION THEREOF

CROSS-REFERENCE TO RELATED APPLICATION(S)

This application is a continuation application of prior application Ser. No. 15/032,522, filed on Apr. 27, 2016, which is a U.S. National Stage application under 35 U.S.C. § 371 of an International application number PCT/KR2014/010480, filed on Nov. 4, 2014, which is based on and claimed priority of a Korean patent application number 10-2013-0132807, filed on Nov. 4, 2013, in the Korean Intellectual Property Office, the disclosure of each of which is incorporated by reference herein in its entirety.

TECHNICAL FIELD

Various embodiments of the present invention relate an electronic device with a touch-screen and a method of executing applications in the electronic device.

BACKGROUND ART

In recent years, the touch-screen market has grown fast. As mobile terminals, laptop computers, smartphones, etc., are equipped with a touch-screen panel, the portable touch-screen market is growing rapidly. In addition, home appliances start to employ a touch-screen panel. In the near future, most home appliances will be equipped with a touch-screen panel.

A touch-screen is configured to have a surface layer for sensing input actions and a display layer for performing an outputting function. A touch-screen-based electronic device receives a user input, or a touch gesture, analyzes and recognizes the user input, and outputs a corresponding result. When the touch screen receives a touch input from the user and transmits a corresponding control command to the electronic device, the electronic device analyzes and recognizes the touch input via the touch sensor, processes a corresponding function, and outputs the result on the touch-screen.

Electronic devices such as terminals, etc. are capable of executing applications to perform various functions. In order to perform a particular function in a terminal, the user activates the corresponding application in the terminal and the terminal executes the function of the activated application. The touch-screen provides users with more intuitive and efficient operations in activating applications in the devices.

DISCLOSURE OF INVENTION

Technical Problem

Conventional electronic devices are disadvantageous in that, in order to execute functions of an application, they execute the application first and then perform the functions according to inputs that the user applies to the touch screen every time. The present invention has been made to address the above problems and disadvantages, and to provide at least the advantages described below. The present invention provides an electronic device with a touch screen and a method of easily and efficiently executing applications in the electronic device.

Solution to Problem

In accordance with an aspect of the present invention, a method of executing applications in an electronic device is provided. The method includes: creating, on a touch-screen, a keyboard interface including a virtual input keypad and an output area in response to a first user input; receiving a second user input via the virtual input keypad, and displaying the second user input on the output area; determining a data attribute of the second user input; displaying a menu including one or more applications corresponding to the data attribute; and receiving a third user input selecting one of the one or more applications included in the menu and executing the selected application.

In accordance with another aspect of the present invention, an electronic device is provided. The electronic device includes: a touch-screen for receiving user inputs and displaying a keyboard interface including a virtual input keypad and an output area; and a controller for controlling: the display of the keyboard interface in response to a first user input; the display of the second user input, received by via the virtual input keypad, on the output area; the determination of a data attribute of the second user input; the display of a menu including one or more applications corresponding to the data attribute; and the execution of an application selected by a third user input, from among the one or more applications included in the menu.

Advantageous Effects of Invention

Embodiments of the present invention allow users to execute functions of an application, more conveniently, using a keyboard interface.

BRIEF DESCRIPTION OF DRAWINGS

FIGS. 5A and 5B shows screens that describe a method of recognizing an image when a call application is executed via a keyboard interface, according to various embodiments of the present invention.

FIG. 6 shows screens that describe a method of executing an application via a keyboard interface according to various embodiments of the present invention.

MODE FOR THE INVENTION

Various embodiments of the present invention are described in detail referring to the accompanying drawings. The same reference numbers are used throughout the drawings to refer to the same or similar parts. Detailed descriptions of well-known functions and structures incorporated herein may be omitted to avoid obscuring the subject matter of the invention.

The terms as used in the present disclosure are merely for the purpose of describing particular embodiments and are not intended to limit the present disclosure. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In the present disclosure, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
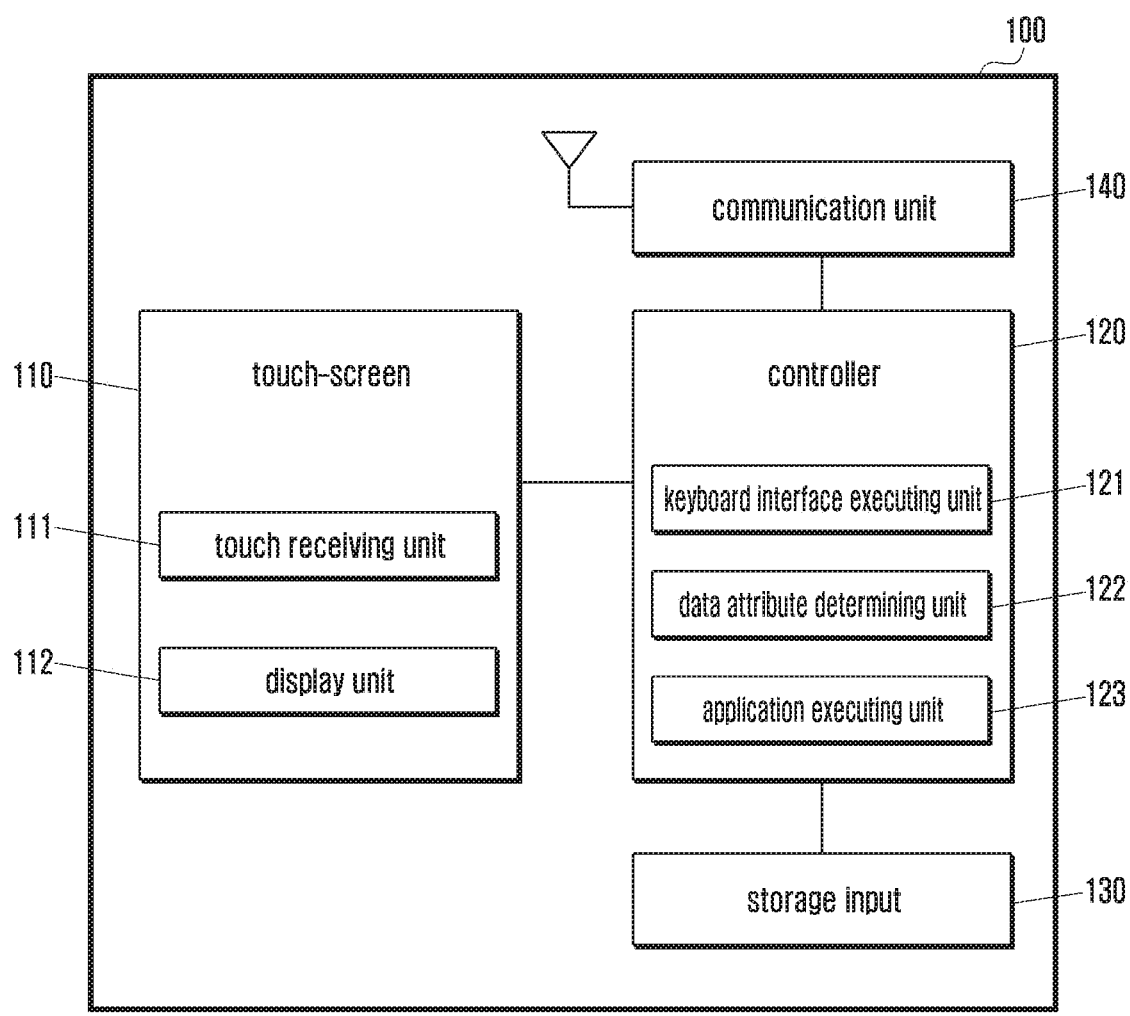
FIG. 1 is a block diagram showing an electronic device according to an embodiment of the present invention.

Referring to FIG. 1, the electronic device 100 is capable of including a touch-screen 110, a controller 140, a storage unit 130 and a communication unit 140.

The touch-screen 110 is configured to simultaneously receive and display touch inputs and perform a displaying function. The touch-screen 110 is implemented to include a touch receiving unit 111 and a display unit 112.

The touch receiving unit 111 is capable of receiving a user's touch inputs applied to the touch-screen. The touch receiving unit 111 is capable of including a touch sensor for detecting a user's touch inputs. The touch sensor may be implemented with a resistive type, a capacitive type, an electromagnetic induction type, a pressure type, and any other types of sensors employing various touch technologies. The touch sensor may also be implemented to detect direct contact inputs or proximity inputs close thereto but apart therefrom within a certain distance.

The display unit 112 displays information processed by the electronic device 100. The display unit 112 is capable of displaying a keyboard interface. The display unit 112 is also capable of displaying applications executed via the keyboard interface.

The controller 120 is capable of controlling all the functions of the electronic device 100.

The controller 120 is capable of including a keyboard interface executing unit 121, a data attribute determining unit 122 and an application executing unit 123.

When a first user input is detected via the touch receiving unit 111, the keyboard interface executing unit 121 is capable of outputting a keyboard interface to the display unit 112. The first user input may be a dragging-input starting from an edge of the touch-screen. For example, when detecting a dragging input applied to the touch screen in a direction from the bottom to the top, the keyboard interface executing unit 121 may display a keyboard interface on an area of the touch-screen, e.g., a bottom area of the touch-screen.

The displayed keyboard interface may include a virtual input pad and an output area. The virtual input pad may be configured, based on various types of text, e.g., Korean, English, symbols, and numbers. In addition, the virtual input pad may include a text switching key. When the text switching key is selected, the keyboard interface executing unit 121 is capable of switching between types of text for the virtual input pad.

The keyboard interface executing unit 121 is capable of receiving a second user input via the virtual input pad, and displaying the received input on the output area.

The data attribute determining unit 122 is capable of determining a data attribute of the second user input. The data attribute determining unit 122 is capable of determining one or more applications corresponding to the determined data attribute and displaying the application menu on the screen. The data attribute may be determined based on a text type of the second user input. For example, when the text type is English, starting with 'www' or 'http,' the data attribute is considered to be a URL address. When the text type is number, starting with '010,' '02,' etc., the data attribute is considered to be a contact phone number. When the data attribute is determined as a URL address, the data attribute determining unit 122 is capable of displaying an Internet browser application menu. When the data attribute is determined as a contact phone number, the data attribute determining unit 122 is capable of displaying a call or message application menu.

When a second user input, e.g., Korean text, is input, the data attribute determining unit 122 is capable of determining whether the received, second user input corresponds to a name contained in the contact details stored in the storage unit 130. When the received, second user input has characters corresponding to a name contained in the contact details, the data attribute determining unit 122 is capable of displaying the name on the output area in preview mode. When the user perceives that the name displayed in preview mode is a name that he/she wants to search for, he/she selects the displayed name. When the data attribute determining unit 122 ascertains that the second user input corresponds to a name contained in the contact details, it is capable of determining that the data attribute corresponds to a contact name and displaying a call or message application menu.

When a second user input, e.g., a number, is input, the data attribute determining unit 122 is capable of determining whether the received, number corresponds to a number contained in the contact details stored in the storage unit 130. When the received, second user input has characters corresponding to a number contained in the contact details, the data attribute determining unit 122 is capable of displaying the number on the output area in preview mode. When the user perceives that the number displayed in preview mode is a number that he/she wants to search for, he/she selects the displayed number. When the data attribute determining unit 122 ascertains that the second user input corresponds to a number contained in the contact details, it is capable of determining that the data attribute corresponds to a contact number and displaying a call or message application menu.

The second user input may be determined as it has a data attribute or various types of attributes. For example, the second user input may be determined based on a contact name or a keyword. In this case, the data attribute determining unit 122 may display all the applications corresponding to the data attributes, e.g., a call or message application, a search application, etc.

In addition, the data attribute determining unit 122 is capable of determining data attributes of the second user input according to various settings and displaying application menus corresponding to the determined data attributes.

The application executing unit 123 is capable of executing an application selected by a third user input, from among the displayed application menus. For example, when a call or message application is selected, the application executing unit 123 is capable of executing a call or message function via a contact name or number displayed on the output area of the keyboard interface. When an Internet browser application is selected, the application executing unit 123 is capable of executing the Internet browser via an URL address displayed on the output area of the keyboard interface. When a search application is selected, the application executing unit 123 is capable of executing a search function via a keyword displayed on the output area of the keyboard interface.

The storage unit 130 is capable of storing data and applications required for functions according to embodiments of the present invention therein. The storage unit 130 is capable of storing contact details containing names and phone numbers therein.

The communication unit 140 is capable of allowing the electronic device 100 to transmit/receive data to/from other devices.

Figure 2:
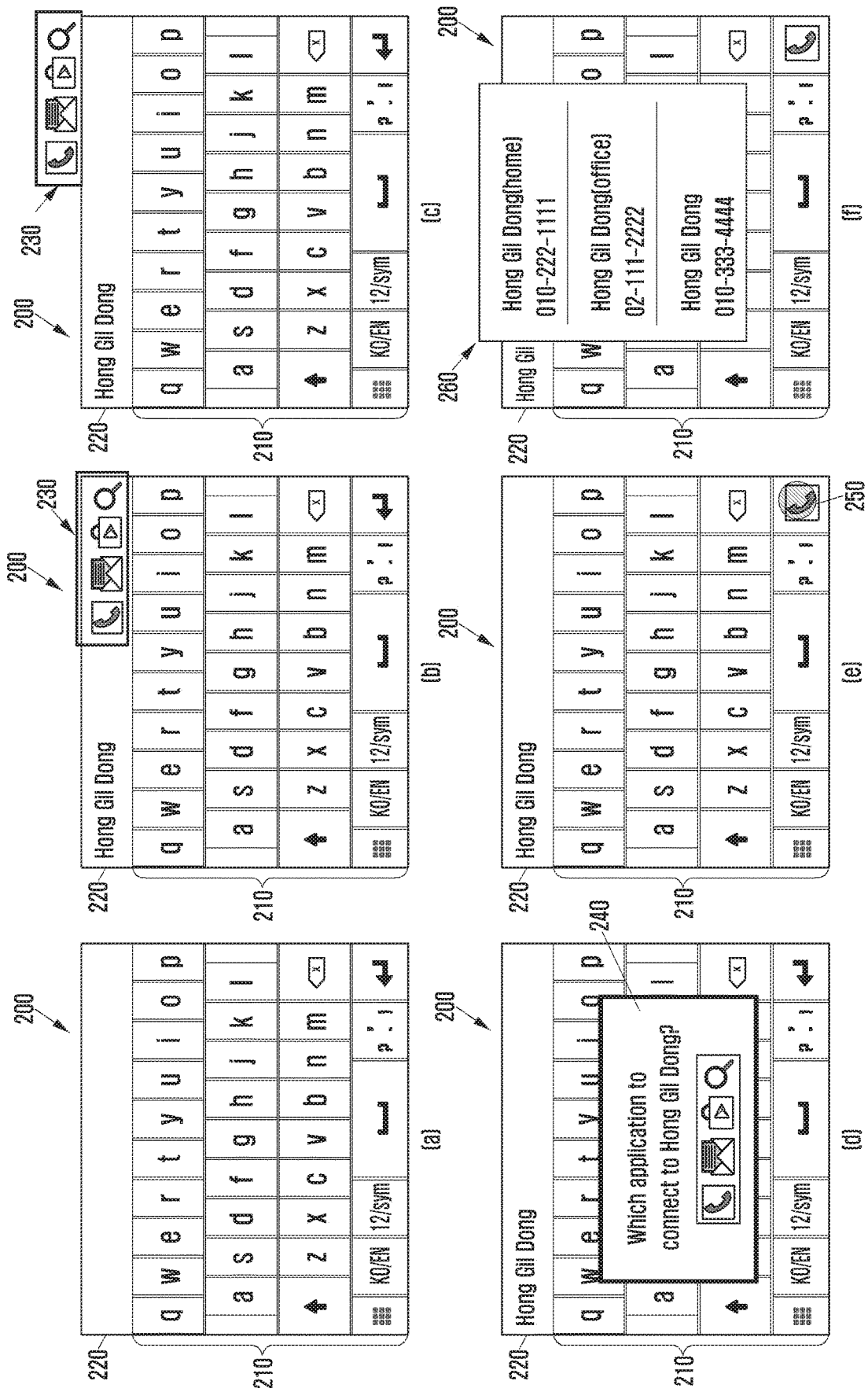
FIG. 2 shows screens that describe a method of executing applications via a keyboard interface according to various embodiments of the present invention.

FIG. 2 shows screens that describe a method of executing applications via a keyboard interface according to various embodiments of the present invention.

Diagram a illustrates an embodiment which displays a keyboard interface 200 in response to a first user input. The keyboard interface 200 may be located in at least part of the area of the touch-screen. The keyboard interface 200 is capable of including a virtual input pad 210 and an output area 220. The virtual input pad 210 may be set in various modes according to text types, including a key for switching between text types.

Referring to diagrams b to e, when the user inputs a second user input to the virtual input pad 210, the second user input is displayed on the output area 220. The data attribute of the second user input is determined and a menu 230 including one or more applications corresponding to the determined data attribute is displayed. When the input, e.g., Hong Gil Dong, corresponds to a name contained in the contact details, the menu 230 may include call and message applications. Since data may be determined as various types, the menu 230 may also include a search application, App Market application, etc. The menu 230 may also include a default application according to a user's settings. As shown in diagram b, the menu 230 may be displayed on the output area 230 of the keyboard interface 200. As shown in diagram c, the menu 230 may be displayed on an area outside the keyboard interface 200. As shown in diagram d, the menu 230 may be displayed in a form of a notification window 240. In addition, the menu 230 may be displayed in such a way that one of the application menus is substituted by one of the keys of the virtual input pad 210. For example, when an input, "Hong Gil Dong," corresponds to a name contained in the contact details, the call application menu 250 is displayed, substituting the Enter key.

Referring to diagram f, when the second user input corresponds to at least part of a name contained in the contact details, the corresponding name and contact number are displayed on a display box 260. It should be understood that a number of names and contact numbers may be displayed on the display box.

Figure 3:
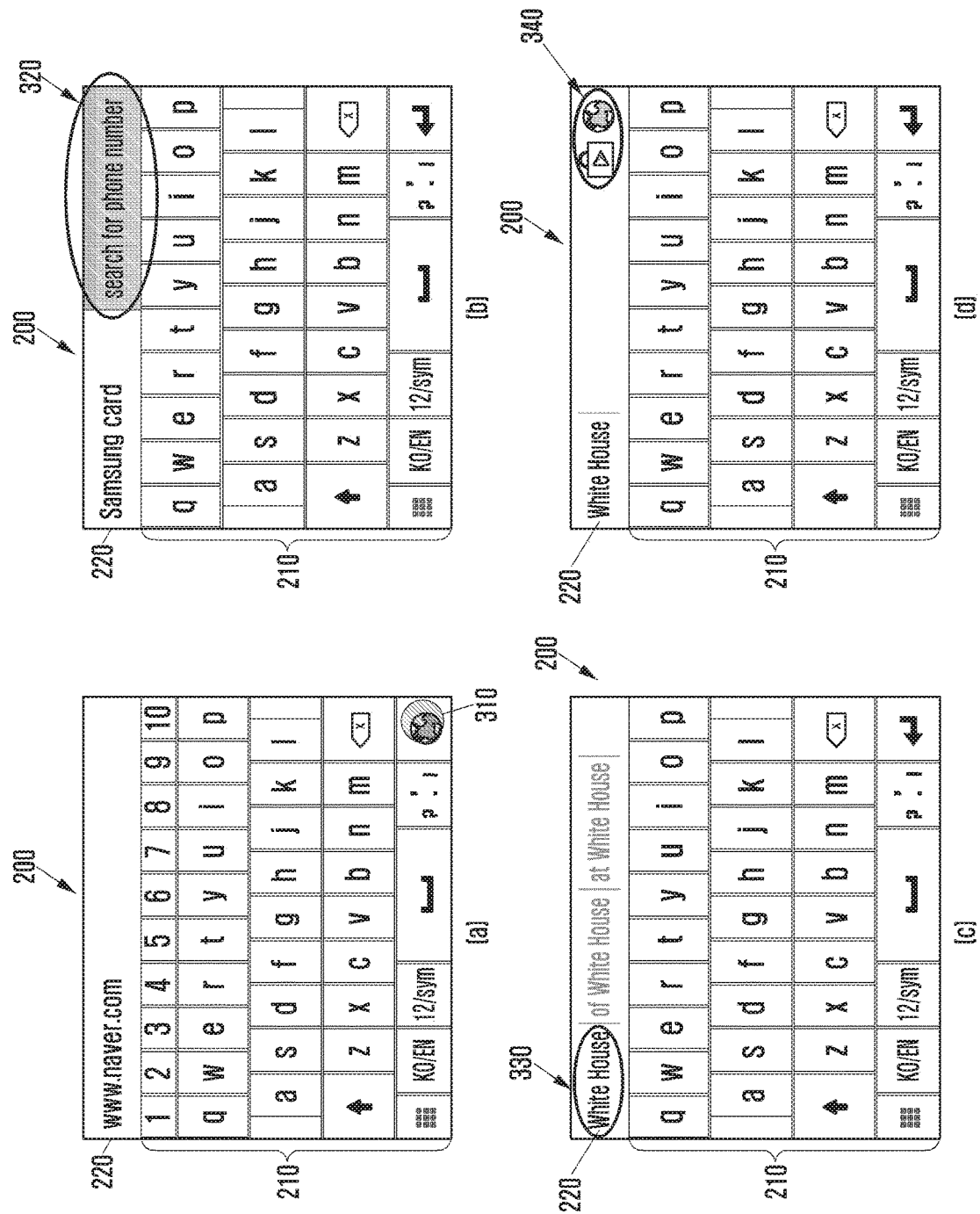
FIG. 3 shows screens that describe a method of executing applications via a keyboard interface according to various embodiments of the present invention.

FIG. 3 shows screens displaying an application menu in response to a second user input according to various embodiments of the present invention. As shown in diagram a, when an URL address as a second user input is input, one of the keys of the virtual input pad 210 is displayed with being substituted by an Internet browser application menu 310. As shown in diagram b, when data in Korean as a second user input, not contained in the contact details, is input, a phone number search application menu 320 for searching for a phone number using the web according to settings may be displayed.

Referring to diagrams c and d, when a second user input is received, the electronic device is capable of extracting expectable input data from the second user input and displaying the extracted data on the output area 220. When the user selects among input data or expectable input data displayed on the output area 220, i.e., selected data 330, the electronic device determines the attribute of the selected data 330 and displays an application menu 340 corresponding to the determined data attribute. When the selected data is a Korean word, a search menu, an Internet browser, App Market application menu, etc. according to settings may be displayed.

Figure 4:
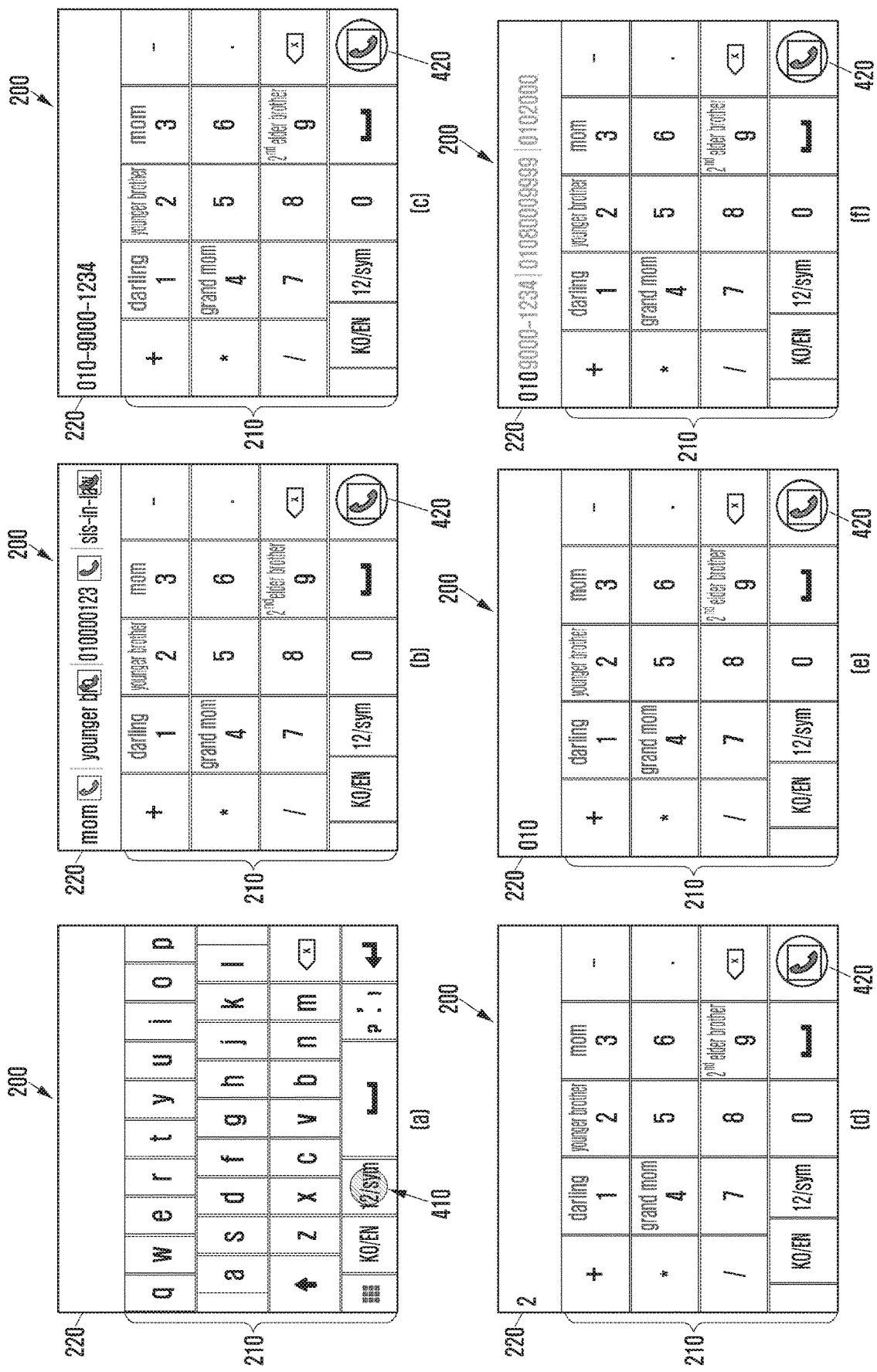
FIG. 4 shows screens that describe a method of executing a call application via a keyboard interface according to various embodiments of the present invention.

FIG. 4 shows screens that describe a method of executing a call application via a keyboard interface according to various embodiments of the present invention.

As shown in diagram a, the keyboard interface 200 may be set as a basic option to provide the virtual input pad 210 with a Korean character-based keyboard layout. When a text switching key 410 of the virtual input pad 210 is selected, the virtual input pad 210 switches from the Korean character-based keyboard layout to a numeric-based keyboard layout as shown in diagram b. When switching to a virtual input pad 210 with a number-based keyboard layout, the electronic device is capable of displaying a call application menu 420 which is substituted for one of the keys of the virtual input pad 210, e.g., Enter key. When the text switching key 410 is selected to switch the virtual input pad 210 from the Korean character-based keyboard layout to a numeric-based keyboard layout, a list of one or more calls that have recently been made may be displayed on the output area 220. When speed dial numbers have already been set for phone numbers, the virtual input pad 210 may display contact details corresponding to the phone numbers on the numeric keys the number of which serve as speed dial numbers.

As shown in diagram c, when the user inputs a second user input corresponding to a contact number and then a third user input for selecting a call application menu 420, the electronic device executes a call application and makes a call connection to the received contact number. As shown in diagram d, when the user applies a long-push input to a speed dial number, the electronic device makes a call connection to the contact number corresponding to the speed dial number. Alternatively, when the user inputs a speed dial number and then select a call application menu 420, the electronic device makes a call connection to the contact number corresponding to the speed dial number.

Referring to diagrams e and f, when the second user input corresponds to at least part of a contact number or contact numbers contained in the contact details, one or more contact numbers are displayed on the output area 220. In this case, contact numbers may be displayed alone or along with contact names. When the user selects one of the displayed contact numbers, the electronic device performs call connection to the corresponding contact number. Alternatively, when the user selects one of the displayed contact numbers and then a call application menu 420, the electronic device performs call connection to the selected contact.

FIGS. 5A and 5B shows screens that describe a method of recognizing an image when a call application is executed via a keyboard interface, according to various embodiments of the present invention.

As shown in diagram 501 of FIG. 5A, an application including an image, e.g., an image of a contact detail, may be executed on a touch-screen 500. When a first user input is applied to the touch screen 500, the corresponding keyboard interface 200 is displayed on the screen. An image recognition menu 510 may be displayed on the keyboard interface 200 according to the settings. Alternatively, the image recognition menu 510 may be displayed only when the application including images is being executed on the touch-screen 500. Although the embodiment is implemented in such a way that the image recognition menu 510 is displayed on the output area 220 of the keyboard interface 200, it should be understood that the present invention is not limited thereto. For example, the image recognition menu 510 may be implemented with a phone number recognition menu.

When the image recognition menu 510 is selected, a notification window 520 for requesting the selection of an image to be recognized may be displayed as shown in diagram 502 of FIG. 5A. Outputting the notification window 520 may be optionally omitted. After that, the user may apply an image selection input 530 to the touch-screen 500 as shown in diagram 503 of FIG. 5A. The image selection input 530 may be an underline or a circle for selecting an image. In the embodiment, the electronic device receives a phone number in a form of image. The electronic device is capable of performing character recognition on the selected image. While character recognition is performing, the notification window 540 is displayed as shown in diagram 504 of FIG. 5B. When character recognition has been completed, the notification window 540 disappears. After that, as shown in diagram 505 of FIG. 5B, when a call application menu 550 is selected, the electronic device is capable of performing call connection to the recognized phone number. When call connection to the recognized phone number is performed, the call connection notification window 560 is displayed on the screen as shown in diagram 506 of FIG. 5B.

FIG. 6 shows screens that describe a method of executing an application via a keyboard interface according to various embodiments of the present invention.

Referring to diagram a, when the touch-screen 500 does not have an input field for requesting the input of data, e.g., when an idle state screen or a home screen is displayed, the electronic device is capable of receiving a first user input and outputting a keyboard interface 200 on the touch-screen 500. The displayed keyboard interface 200 may be divided into a virtual input pad 210 and an output area 220. The virtual input pad 210 may contain one or more application menus according to a user's settings. The virtual input pad 210 may be set in such a way as to contain application menus which are frequently used or essential. The output area 220 may display recently used application icons in a form of history. For example, the output area 220 may display icons in order of execution from the latest to the oldest, e.g., in order of a call icon, a message icon, a camera icon, etc. When the user selects an icon corresponding to an application, the electronic device is capable of executing the application. That is, according to various embodiment of the present invention, the keyboard interface 200 serves as a tool for executing applications.

Referring to diagram b, when the user inputs a second user input to the virtual input pad 210, the electronic device displays the received input on the output area 220. When data of "Hong Gil Dong" as a second user input corresponds to a name contained in the contact details, the electronic device displays, on the output area 220, contact details corresponding to the name, e.g., a photo, a name, a phone number, etc. The electronic device may further display a message asking the user whether he/she wants to make a call to a corresponding contact.

Referring to diagram c, when the electronic device receives the second user input via the virtual input pad 210, it searches for an application menu starting with data of the second user input and displays the second user input along with the searched application menu on the output area 220. For example, when the user inputs a letter "car," the electronic device displays application icons starting with "car" on the output area 220. The application search may be performed for applications stored in the electronic device. Alternatively, the application search is performed with respect to servers via a network. According to an embodiment, when the electronic device has not searched for an application menu starting with data of the received, second user input as shown in diagram c, it determines whether the corresponding list is stored in the contact details as shown in diagram b.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

What is claimed is:

1. A method of executing applications in an electronic device, the method comprising:
 in response to receiving a first user input on a touch screen of the electronic device, displaying a keyboard interface, wherein the keyboard interface includes a virtual input keypad and a menu on the touch screen, the menu including an image recognition menu and a plurality of icons related to at least one application of a user setting, the icons displayed in order of execution from latest to oldest, the at least one application of the user setting including at least one of a search application, an internet browser, an app market application or a camera application, wherein the virtual input keypad comprises a plurality of text types, and a key for switching between the text types;
 receiving a second user input though the virtual input keypad;
 displaying, on an output area, a text corresponding to the second user input;
 extracting expectable input data from the second user input;
 displaying the extracted expectable input data on the output area;
 when the user selects among input data or the expectable input data that is displayed on the output area, determining an attribute of the selected data and displaying the menu corresponding to the determined data attribute;
 when a call application including an image is executed via the keyboard interface, displaying only an image recognition icon on the image recognition menu on the keyboard interface;
 in case the image recognition menu is selected, receiving a third user input for selecting the image;
 recognizing characters on the selected image;
 displaying a notification of character recognition on the touch screen only while the characters are being recognized, the notification of character recognition being displayed in a separate area of the screen from the recognized characters;
 displaying the recognized characters on the output area; and
 in case the search application is selected, displaying a search result in the output area.

2. The method of claim 1, further comprising:
 receiving a user input for selecting at least one icon among the plurality of icons; and executing at least one application corresponding to the selected at least one icon in response to the user input.

3. The method of claim 1, wherein the notification of character recognition ceases to be displayed when the recognition of characters is complete without user interaction with the touch screen.

4. An electronic device comprising:
a touch screen; and
at least one processor configured to:
- in response to receiving a first user input on the touch screen, control the touch screen to display a keyboard interface, wherein the keyboard interface includes a virtual input keypad and a menu, the menu including an image recognition menu and a plurality of icons related to at least one application of a user setting, the icons displayed in order of execution from latest to oldest, the at least one application of the user setting including at least one of a search application, an internet browser, an app market application or a camera application, wherein the virtual input keypad comprises a plurality of text types, and a key for switching between the text types,
- receive a second user input though the virtual input keypad,
- control the touch screen to display, on an output area, a text corresponding to the second user input,
- extract expectable input data from the second user input,
- control the touch screen to display the extracted expectable input data on the output area,
- when the user selects among input data or the expectable input data that is displayed on the output area, determine an attribute of the selected data and control the touch screen to display the menu corresponding to the determined data attribute,
- when a call application including an image is executed via the keyboard interface, control the touch screen to display only an image recognition icon on the image recognition menu on the keyboard interface,
- receive a third user input for selecting the image in case the image recognition menu is selected,
- recognize characters on the selected image,
- control the touch screen to display a notification of character recognition only while the characters are being recognized, the notification of character recognition being displayed in a separate area of the screen from the recognized characters,
- control the touch screen to display the recognized characters on the output area, and
- in case the search application is selected, control the touch screen to display search result in the output area.

5. The electronic device of claim 4, wherein the at least one processor is further configured to:
- receive a user input for selecting at least one icon among the plurality of icons, and
- execute at least one application corresponding to the selected at least one icon in response to the user input.

6. The electronic device of claim 4, wherein the notification of character recognition ceases to be displayed when the recognition of characters is complete without user interaction with the touch screen.

* * * * *